H. A. MANN.
WALKING MANIKIN.
APPLICATION FILED JULY 11, 1910.
1,008,348.
Patented Nov. 14, 1911.
5 SHEETS—SHEET 1.
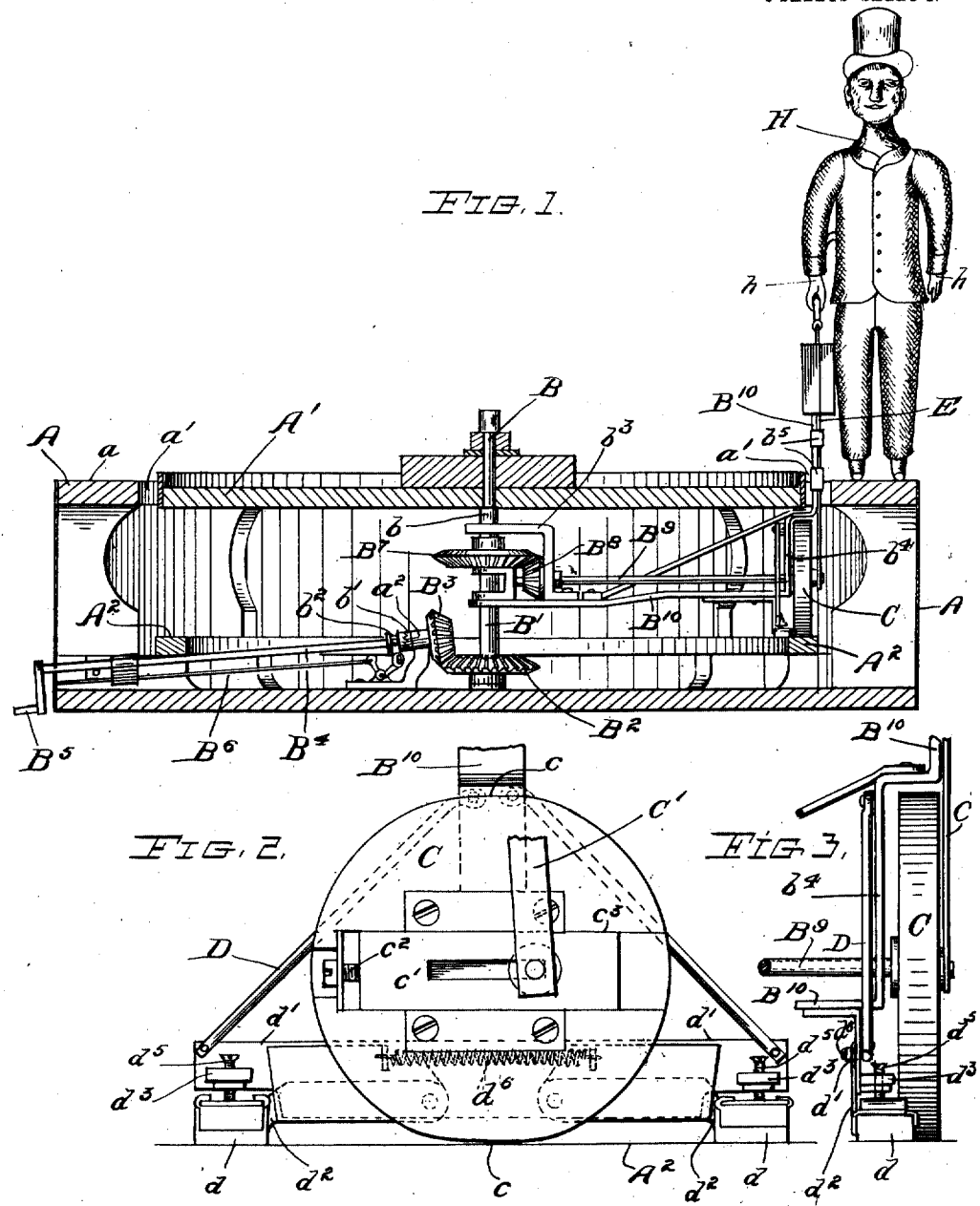

H. A. MANN.
WALKING MANIKIN.
APPLICATION FILED JULY 11, 1910.
1,008,348.
Patented Nov. 14, 1911.
5 SHEETS—SHEET 2.
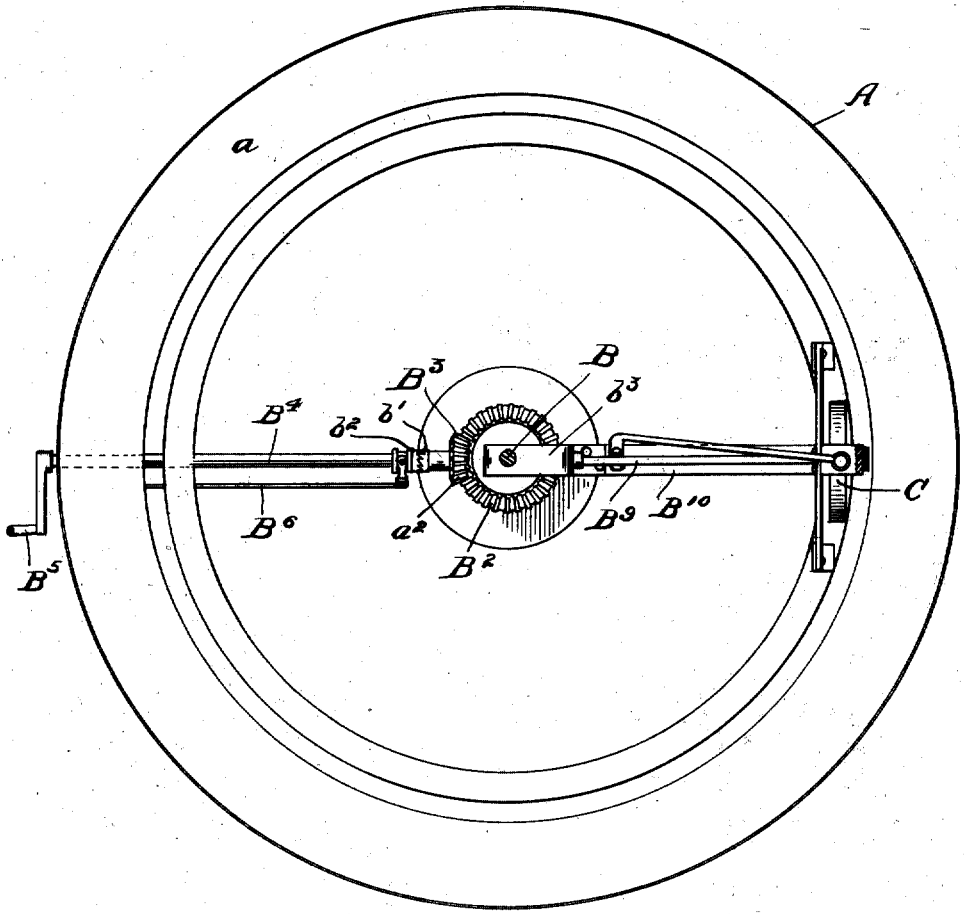
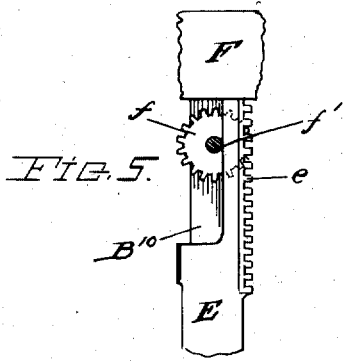
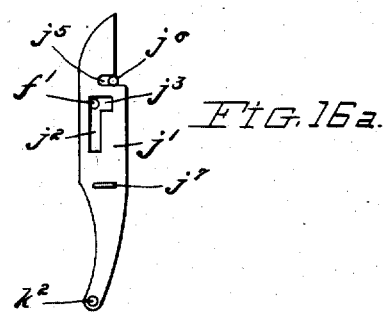
Witnesses.
Herman Eisele
Lena A. Dirlam
Inventor:
Horace A. Mann
by W. Merkel,
his Attorney.

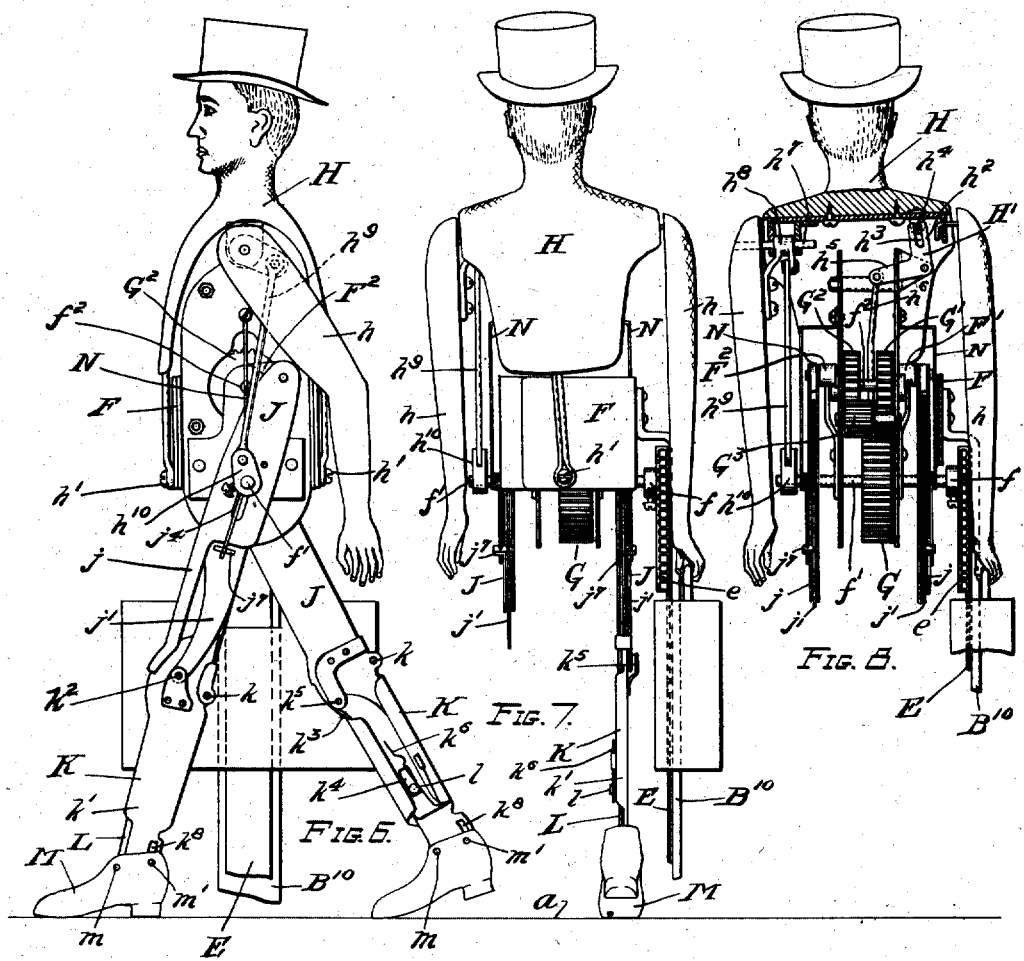
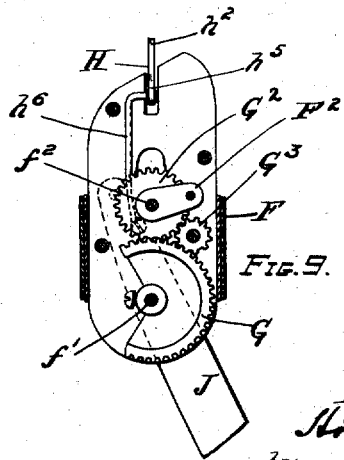

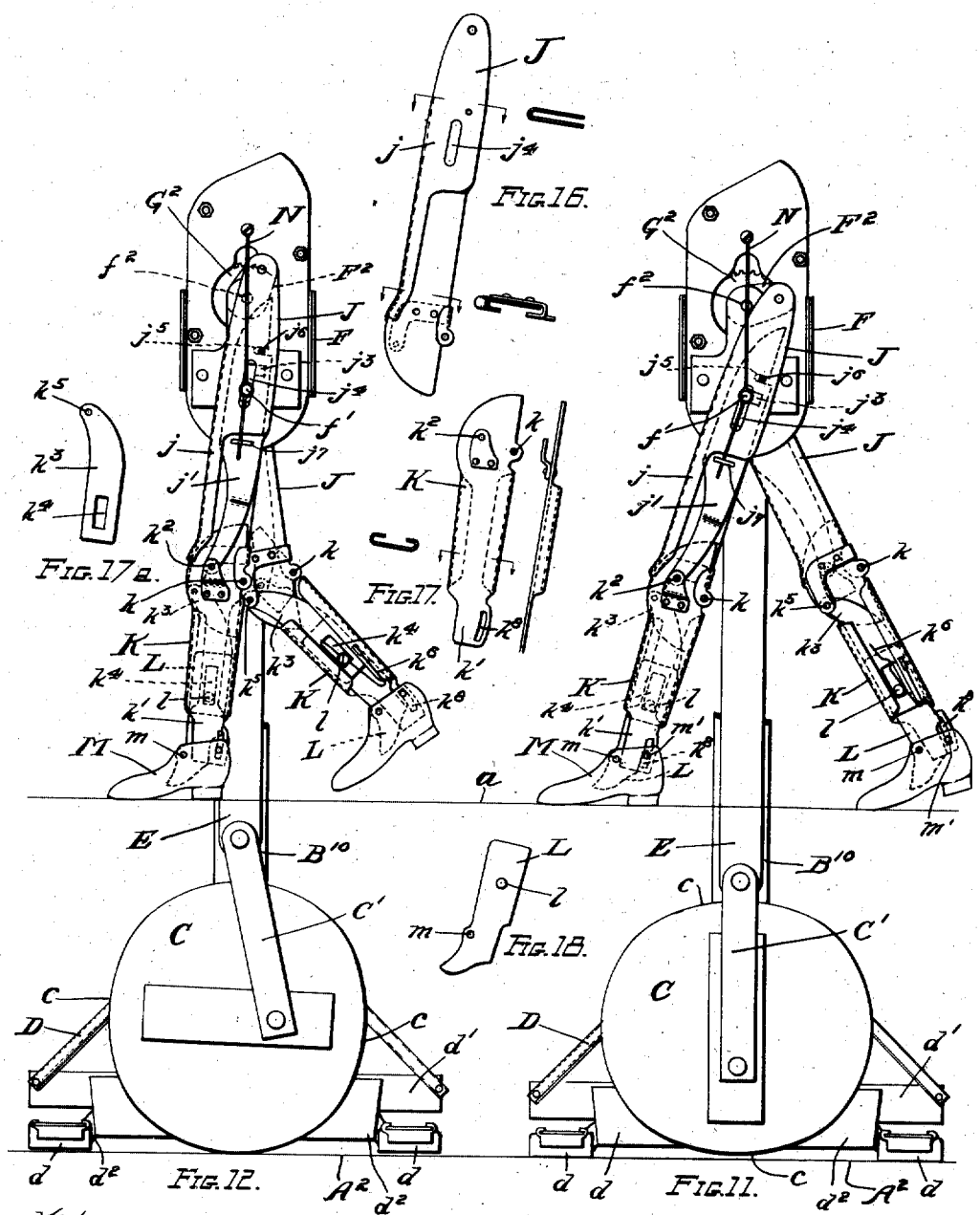

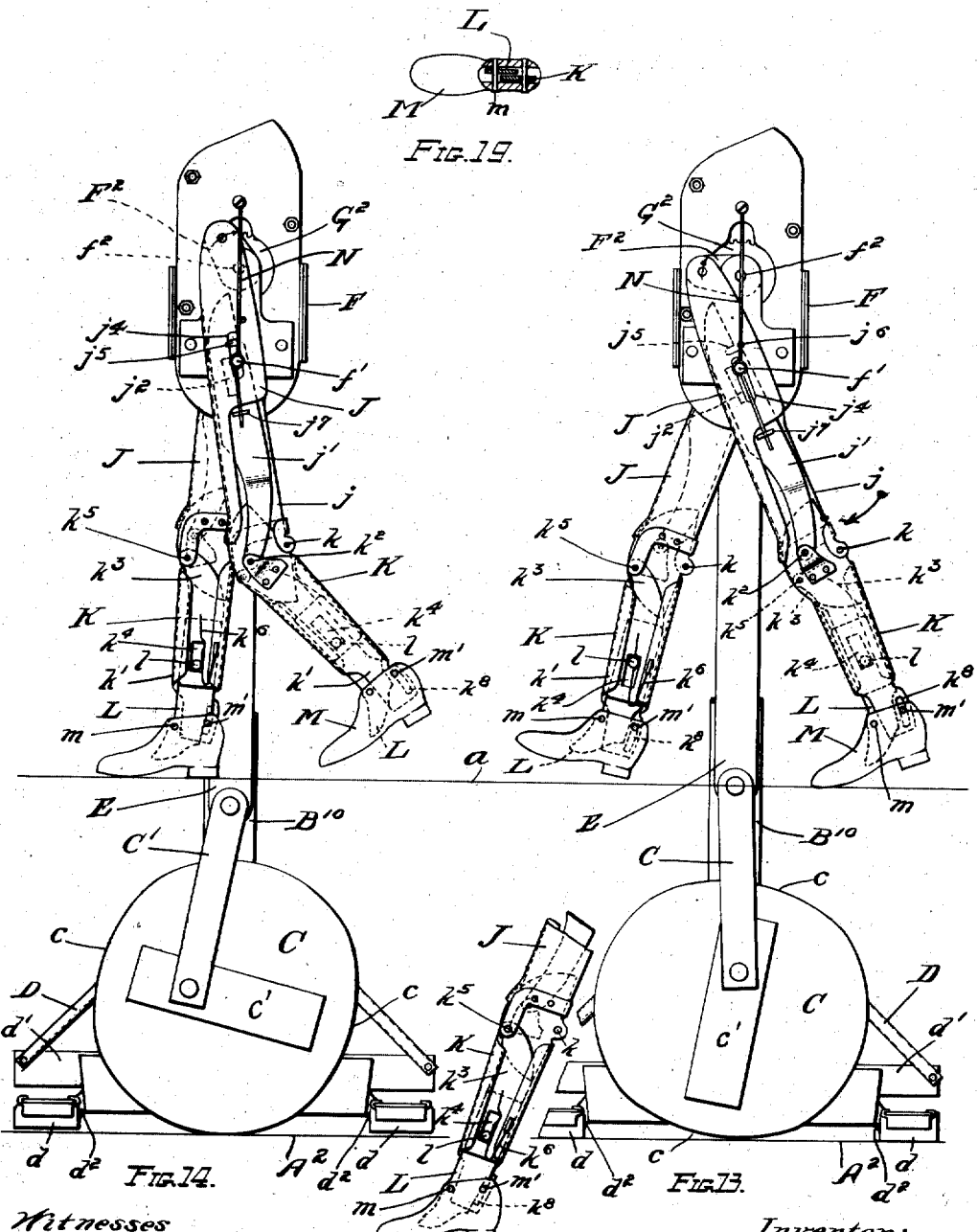

UNITED STATES PATENT OFFICE.

HORACE A. MANN, OF OBERLIN, OHIO, ASSIGNOR OF ONE-HALF TO T. H. ROWLAND, OF OBERLIN, OHIO.

WALKING MANIKIN.

1,008,348.   Specification of Letters Patent.   Patented Nov. 14, 1911.

Application filed July 11, 1910. Serial No. 571,272.

*To all whom it may concern:*

Be it known that I, HORACE A. MANN, a citizen of the United States, resident of Oberlin, county of Lorain, and State of Ohio, have invented a new and useful Improvement in Walking Manikins, of which the following is a specification, the principle of the invention being herein explained and the best mode in which I have contemplated applying that principle, so as to distinguish it from other inventions.

My invention relates to walking manikins, its object being to provide a manikin which will as nearly as possible simulate the act of walking of a human being.

The said invention consists of means hereinafter fully described and particularly set forth in the claims.

The annexed drawings and the following description set forth in detail certain mechanism embodying my invention, the disclosed means, however, constituting but one of various mechanical forms in which the principle of the invention may be used.

In said annexed drawings:—Figure 1 is a vertical axial section of the support showing the propelling mechanism and manikin in elevation. Fig. 2 is an enlarged detail front elevation, and Fig. 3 is a side elevation on the same scale, of the propelling wheel and adjacent parts detached. Fig. 4 is a plan of the support and propelling mechanism. Fig. 5 is a detail on an enlarged scale of part of the operating mechanism. Fig. 6 is a side elevation of the manikin. Fig. 7 is a rear elevation of the upper portion of such manikin showing also the operating mechanism therefor. Fig. 8 is a section of the manikin body, showing the interior mechanism. Fig. 9 is a detail elevation of parts of the interior operating mechanism of the manikin. Fig. 10 is a curve illustrating the path of movement of the lower end of the main thigh member. Fig. 11 is a side elevation of the lower part of the manikin together with the propelling mechanism illustrating the manikin in the position in which the forward leg has just been placed down, and the rear leg is about to be lifted and moved forward. Fig. 12 is a view similar to that of Fig. 11, showing the position of the parts after the manikin has assumed a position in advance of that illustrated in Fig. 12. Figs. 13 and 14 are views similar to that shown in Fig. 11, showing further successive positions in advance of that shown in said Fig. 12. Fig. 15 is an elevation of the leg which is shown in Fig. 11 to be in the rear, and after it has reached its farthermost forward position and the foot has been placed upon the walk. Fig. 16 is an elevation of the main thigh member, together with two cross sections thereof taken upon the planes indicated by broken lines, and as viewed in the direction indicated by the arrows adjacent thereto. Fig. 16ª is a detail view of the secondary thigh member of the manikin. Fig. 17 is an elevation of the main lower leg member, together with a side elevation thereof and a section taken upon the plane indicated by the broken lines, and in the direction indicated by the arrows adjacent thereto. Fig. 17ª is an elevation of the secondary lower leg member. Fig. 18 is an elevation of the ankle member. Fig. 19 is a cross section of the foot member with ankle member attached.

For containing the propelling mechanism and forming the walk upon which the manikin travels, a circular box A is provided, which is provided upon the upper surface with an annular walk $a$. Fixedly secured in a vertical position to the bottom of the box is a post B. The circular space in the center of the upper portion of the box is partially occupied by a disk A′, leaving an annular space $a'$ between the walk and periphery of the disk, which rests upon the upper end $b$ of a sleeve B′, which is rotatable upon the post B. Upon the lower end of this sleeve is fixed a bevel gear B² which engages with a bevel pinion B³ mounted in a suitable bearing $a^2$. Connected with this pinion is a clutch-member $b'$ which may engage with a shifting clutch member $b^2$ rotatably secured to a driving shaft B⁴ whose outer end projects through the box and is provided with a crank B⁵. Of course, it will be understood that suitable automatically operating means may be provided, such as an electric motor, and suitably connected with this shaft B⁴ for operating the device. The clutch member $b^2$ is actuated by a shifting rod B⁶, whereby the shaft B⁴ may be thrown into or out of operative relation with the pinion B². Also fixedly secured to the sleeve B′ is a second bevel gear B⁷ which meshes with a bevel pinion B⁸ fixedly secured upon a horizontal propelling shaft $B^9$, which is mounted in a frame $B^{10}$ whose inner end is loosely mounted upon the sleeve $B'$. The inner end of the shaft has a bearing in a portion $b^3$ of the frame, which is loosely mounted upon the upper end $b$ of the sleeve $B'$ and above the bevel gear $B^7$, as shown in Fig. 1. The outer end of the shaft has a bearing in an upturned portion $b^4$ of the frame $B^{10}$. Upon the outer end of the shaft $B^9$ is fixedly secured a propelling wheel C, which is provided with diametrically opposite curved flattened peripheral portions $c\ c$, Fig. 2. The outer face of this wheel is provided with a slot $c^3$ in which is the sliding member $c'$ adjustable in said slot and adjustably fixed therein by means of a screw $c^2$, as will be readily understood. Mounted upon this adjustable sliding member $c'$ is one end of a connecting rod $C'$, the articulation of this connecting rod being, as shown, eccentric with reference to the axis of rotation of the wheel C. The adjustment of the sliding member $c'$ by means of the screw $c^2$ will, as will be readily understood, vary the throw of the connecting rod, and hence of any other parts which may be attached thereto. Carried by the upwardly projecting portion $b^4$ of the bar $B^{10}$ is a frame D, to whose lower surface are secured by any suitable means two rubber retarding members $d\ d$.

Upon the inside and forming part of the box is an annular track $A^2$ which is located immediately below the path of travel of the propelling wheel C and retarding members $d\ d$. These retarding members are preferably made of rubber, and rest upon said track when the propelling wheel is in a position in which the flattened surfaces $c\ c$ are contiguous to such track. The lower part of the frame D consists of a cross piece $d'$ upon whose two ends are pivoted the two members $d^2\ d^2$. This piece $d'$ is provided with horizontal lugs $d^3\ d^3$ having vertical threaded openings which receive adjusting screws $d^5\ d^5$, whose lower ends bear against the upper surfaces of said members $d^2\ d^2$ carrying the retarding members $d\ d$. A spring $d^6$ tends to keep the outer ends of members $d^2\ d^2$ elevated. It will therefore be seen that by means of the adjusting screw $d^5\ d^5$ the relation of the propelling wheel C to the track when members $d\ d$ are resting on the latter may be varied. This permits the said wheel to have imparted to it a position in which the flattened portion $c$ will either not come into frictional engagement with the track $A^2$, or have such slight engagement that the wheel will not travel when in this position.

As a result of the above described construction, it will be seen that by turning the shaft $B^4$, sleeve $B'$ will be rotated through the medium of gear $B^2$ and pinion $B^3$. This rotation will effect the rotation of gear $B^7$, pinion $B^8$, operating shaft $B^9$, and through the latter the propelling wheel C, as well as the movement of wheel C on its track, and during such rotation, it will be seen that when the circular portions $c$ reach the lower positions in their travel, they will engage the track $A^2$, and in so doing raise the retarding members $d\ d$ and permit the wheel to travel along the track and carry with it the bar $B^{10}$. When the wheel travels farther and a distance sufficient to bring one of the flattened surfaces contiguous to the track, it will be seen that the frame D and bar $B^{10}$ will be lowered until the retarding members $d\ d$ come into contact with the track $A^2$, and there will be a cessation of forward movement of the wheel depending upon the length of the flattened surface and the relation of the wheel with reference to the track $A^2$ obtained by the adjusting screws $d^5\ d^5$. It will therefore be seen that the wheel will travel intermittently, periods of rest occurring between such intermittent movements, such periods of rest depending upon the length of time that the wheel is out of operative contact with the track, which length of time depends upon the adjustment obtained, as before described, by the screws $d^5\ d^5$.

The bar $B^{10}$ extends over the wheel C, as shown in Fig. 1, and then projects upwardly through the annular space $a'$ between the disk $A'$ and the annular walk $a$. Upon the upper end of this upwardly extending portion of the bar $B^{10}$ is secured the manikin, as shown in Figs. 7 and 8. Sliding between guides $b^5$ secured to the bar $B^{10}$ is a vertically reciprocating member E, Figs. 7, 8, 13 and 14. Upon the edge of the upper end of this member E is formed a rack $e$ which engages a pinion $f$ secured to a transverse rock shaft $f'$ which is mounted in the body or trunk member F of the manikin, these parts being specifically illustrated in Fig. 5. Fixedly secured to this rock shaft $f'$ is a gear segment G, Figs. 8 and 9. Mounted in the trunk member F and above rock shaft $f'$ are two separately mounted rock shafts $f^2\ f^2$, upon which are respectively secured two gears $G'\ G^2$. Gear $G'$ meshes with the segment G, and gear $G^2$ meshes with an intermediate pinion $G^3$ which meshes also with the segment G, as shown in Fig. 8. The outer ends of the rock shafts $f^2\ f^2$ are respectively provided with rocker arms $F'$ and $F^2$. The lower end of the reciprocating member E is connected with the upper end of the connecting rod $C'$. The rotation of the propelling wheel C will therefore effect the reciprocation of the member E, and hence the oscillation of the pinion $f$, rock shaft $f'$ and segment G. Through the latter the gears $G'\ G^2$ will be oscillated in opposite directions and so also the rock shafts $f^2\ f^2$ and the rocker arms $F'\ F^2$. These latter arms articulate with the leg members of the manikin, and effect their opposite oscillation, as will be further described.

The upper or shoulder and head portion H of the manikin, carrying the two arms h, is made to form one element which is pivoted in the front and rear on the trunk member F by means of the screws h' h,' as shown in Fig. 6. Pivoted on the interior of this head and shoulder member is a bell crank H', Fig. 8, whose one arm $h^2$ is provided with a slot $h^3$ engaging a pin $h^4$ fixed to said member. The other arm $h^5$ articulates with a connecting rod $h^6$ which articulates with the gear G'. The oscillation of this latter gear therefore will effect the rocking of the bell crank, and hence a sidewise rocking movement of the head and shoulder of the manikin while the latter is being propelled, simulating a similar movement in a walking human being. The outside arm h of the manikin is oscillatorily mounted in the head and shoulder member, as shown in Fig. 8, by means of a pin $h^7$. Fixed upon this pin is a rocker arm $h^8$, which articulates with a connecting rod $h^9$ whose lower end is connected with a second crank arm $h^{10}$, fixed to the rock shaft f'. The oscillation of the rock shaft will therefore effect a swinging movement of the arm, also simulating a similar movement in a walking human being.

The two legs are identical in their structure, excepting in so far as the parts are reversed so as to form a left and a right; a description of the construction and operation of one leg will therefore suffice for the other.

Each leg consists of a thigh member J, a lower leg member K, an ankle member L, and a foot member M. The thigh member comprises a main member j and a secondary member j', Figs. 16 and 16a. The main member is of channel cross-section. The secondary thigh member j' is slidably mounted in the interior of main member j, and is provided with a slot $j^2$ having an upper transverse enlarged portion $j^3$. The rock shaft f' projects through a slot $j^4$ formed in the main thigh member, as shown in Fig. 16, and this slot registers with the slot $j^2$ in the secondary thigh member, the said rock shaft f' projecting through same also. It will therefore be seen that the secondary thigh member may slide in its longitudinal direction, and when the pin is at the upper end of the slot may be moved laterally a short distance, by reason of the provision of the enlarged transverse portion $j^3$. This secondary member is furthermore provided with a second transverse slot $j^5$ which is adapted to engage a second pin $j^6$ also secured to the main thigh member j. This slot, as shown, intersects the rear edge of the secondary member so that when the upper portion of the latter is pushed forwardly the slot $j^5$ disengages the pin $j^6$, thus disengages the secondary member, and permits movement of the latter with reference to the said main thigh member, as will be hereinafter explained. Having its upper end secured to the trunk member of the manikin is a spring N which is given a few turns about the shaft f', and has its lower end connected with the lug $j^7$ projecting from the outer side of the secondary thigh member j', as shown in Figs. 11, 12, 13 and 14. The lower end of this spring therefore oscillates with the thigh member, as will be readily understood, and its tension is such that when the said thigh member is in its rearmost position, as shown in Fig. 13, the secondary thigh member will be pushed forwardly so as to disengage the pin $j^6$, as shown in dotted lines in said Fig. 13. This tension is furthermore such that when the said leg is in its farthermost forward position the secondary member will be pushed backwardly so as to engage said pin, as shown in Fig. 11.

The leg parts thus far described operate as follows: Assuming the parts to be in the position shown in Fig. 13, and that the rocker arm f' is being oscillated, the upper end of the main thigh member will be also oscillated, the slotted construction thereof permitting, as will be readily understood, a longitudinal direction of movement on the part of said thigh member. As the manikin is now moved forward, the lower end of the thigh member moves forward, but the secondary thigh member is held stationary with reference to the trunk member by the rock shaft f', the latter in this position engaging the transverse portion $j^3$ of the slot $j^2$. The leg-operating gear in the trunk member is so arranged that the rocker arms F' F² will swing in arcs above the horizontal plane passing through their axis of oscillation. The upper end of the main thigh member will therefore swing in the direction indicated by the arrow in Fig. 13, and at the same time be raised. A relative movement of the main thigh member and secondary thigh member is therefore effected, such relative movement being first downwardly, then upwardly, on the part of the secondary thigh member, the latter, however, actually being mounted on a pivot fixed with reference to the trunk. This relative movement effects a flexing of the lower leg member, as will be hereinafter described. Assuming now that the described leg has reached its forward position, or that shown in Fig. 11, the spring N will have shifted the secondary member rearwardly so as to cause a reengagement of the slot $j^5$ and pin $j^6$. As the thigh member is now oscillated in the opposite direction, and consequently raised and then lowered, the secondary thigh member moves upwardly with the main thigh member, and their relative position is stationary during this return movement of the leg. A given fixed point in the lower end of the main thigh member will therefore describe a path indicated by the full portion of the curve shown in Fig. 10, the dotted portion of this curve being that which would be described by said point in case the thigh member were oscillated by a complete revolution of the rocker arm F'. By arranging the rocker arm F', however, so as to swing in an upper arc, such as was described, a movement of the lower end of the thigh member is caused to have a substantially flat or straight path of travel. By imparting such path of travel to this member, I am able to effect a nearer simulation of the human act of walking than has heretofore been obtained, in so far as I am aware, inasmuch as the knee of a human being also travels in a substantially straight line, or to be more exact, moves in the arc of a circle whose axis is the lower leg and whose center is in the foot.

Pivoted upon the rear of the main thigh member is the lower leg member K pivoted at $k$, and the main lower log member $k'$ articulates also with the lower end of the secondary thigh member $j'$ at the point $k^2$, Fig. 11. The upper end of the main lower leg member is formed on an arc having the axis $k$ of oscillation as a center, so that said upper end may swing without interference on the part of the main thigh member. It will therefore be seen that the oscillation of the thigh member from the position shown in Fig. 13, which as before explained, first effects a relative downward and then a relative upward movement on the part of the secondary thigh member $j'$, will cause the main lower leg member to flex. Such flexed position of the one leg is shown in Fig. 14, and of the other leg in Fig. 12. As the leg reaches its foremost position, the lower leg member will have been again brought into alinement with the thigh member, as shown in Fig. 11.

The secondary lower leg member $k^3$, Fig. 17$^a$, slides in the main lower leg member, and at its lower end is provided with a slot $k^4$, and its upper end articulates with the main thigh member at $k^5$, Fig. 15. The ankle member L is slidably mounted in the lower leg member, and is provided with a pin $l$ which projects through the said slot $k^4$. Secured to the main lower leg member is a spring detent $k^6$, which is adapted to hold and engage the pin $l$ when the latter is in a position opposite the detent portion of said spring, as shown in Fig. 13. This will also hold, as will be readily understood, the ankle member L in a raised position with reference to the lower leg member. It will therefore be seen that when the knee of the manikin is flexed, the secondary lower leg member will be raised and lowered with reference to the main lower leg member. The length of the slide is made such that this movement of the secondary lower leg member will raise the ankle member L so as to permit the spring $k^6$ to engage the pin $l$ and hold said ankle member in such raised position. This slide is made furthermore such that as the secondary lower leg member is lowered, the upper end of the slide will disengage the pin $l$ from the spring, and permit the ankle member L to drop by gravitation.

Loosely pivoted at $m$ to the forward part of the ankle member L is the foot member M, Figs. 15 and 19. The lower end of the main lower leg member also extends into the foot member, and is provided with a rearwardly placed slot $k^8$ formed upon the arc of a circle having the axis $m$ as a center, and a pin $m'$ passes through the foot member and this slot. This permits a limited oscillatory movement of the foot member on the ankle member, as will be readily understood. Such pin and slot engagement permits the heel of the foot member to rise, as shown in Fig. 14, when the lower leg member is flexed, thus also simulating the movement in an actual human being. When the leg is in its rearmost position, the pin $l$ is out of engagement with the spring $k^6$. As the leg is now moved forward, the lower leg member is flexed and the secondary lower leg member is raised, thus raising the ankle member and effecting the engagement of the pin $l$ with the spring $k^6$. This engagement and raised position of the foot with reference to the ankle is maintained until the leg reaches a position just preceding its final forward position. The secondary lower leg member at this point engages, on its downward movement, the pin $l$ and disengages same, and therefore the ankle member, from the spring $k^6$. At the end of the forward movement of the leg, therefore, the foot drops by gravity and assumes a natural position on the walk $a$, as will be readily understood. There being no rigid connection between the ankle member and lower leg member, the rearward movement of the leg and natural adjustment of said two parts, are readily effected.

Having fully described my invention, what I claim and desire to secure by Letters Patent is:—

1. The combination with a manikin having oscillatory leg members; of continuously operating means for actuating said manikin, and including mechanism for effecting the oscillation of said leg members, together with mechanism for intermittently propelling the manikin.

2. The combination with a manikin having oscillatory leg members; continuously operating means for actuating the manikin, and including mechanism for effecting the oscillation of said leg members, together with mechanism connected with said leg-oscillating mechanism for intermittently propelling the manikin.

3. The combination with a manikin having oscillatory leg members; a shaft and means for continuously rotating same; mechanism connected with said shaft for effecting the oscillation of said leg members; and mechanism also connected with said shaft for intermittently propelling the manikin.

4. The combination of a box or casing provided with an endless walk; a supporting member mounted so as to move in a path parallel with said walk; a manikin having oscillatory leg members and mounted upon said support above said walk; means for effecting the oscillation of said leg members; and means adapted to intermittently propel said support and connected with said leg-oscillating mechanism.

5. The combination with a suitable box or casing provided with an endless walk; a support mounted in said box or casing so as to have a path of movement parallel with said endless walk; means for intermittently propelling said support; a continuously operable shaft for actuating said means; a manikin having oscillatory leg members and mounted upon said support above said walk; mechanism for oscillating said leg members; said leg-oscillating mechanism connected with said shaft.

6. The combination of a suitable track; a manikin; propelling mechanism including an actuating member adapted to intermittently engage said track; means connecting said member and manikin, whereby the latter is intermittently actuated; and means for rendering said member stationary with reference to said track during the intermissions between such actuations of said manikin.

7. The combination of a suitable track; a manikin; propelling mechanism including an actuating member adapted to intermittently engage said track; means connecting said member and manikin whereby the latter is intermittently actuated; and means connected with said member adapted to intermittently engage said track during the intermissions between such actuations of said manikin, whereby the said mechanism is rendered stationary during such intermissions.

8. The combination of a suitable track; a manikin; propelling mechanism including a support for the manikin; and a propelling member mounted upon said support and adapted to intermittently engage said track; means connecting said member and manikin whereby the latter is intermittently actuated; and means for rendering said member stationary with reference to said track during the intermissions between such actuations of said manikin.

9. The combination of a suitable track; a manikin; propelling mechanism including a support for the manikin, and a propelling member mounted upon said support, adapted to intermittently engage said track whereby the manikin is intermittently propelled; and means connected with said support intermittently engaging said track during the intermissions between such actuation of said manikin, whereby said support is rendered stationary with reference to said track during such intermissions.

10. The combination of a suitable track; a manikin; propelling mechanism including a support for the manikin, a rotary wheel having a portion of its periphery flattened, and means for rotating said wheel; a stopping member secured to the support and mounted above said track, the distance from a horizontal plane passing through the wheel's axis to the lower end of said stopping member being greater than the distance from said axis to the flattened portion of the periphery, and less than the distance from said axis to the circular portion of said periphery; and means connecting said wheel with said manikin.

11. The combination of a circular track; a vertically mounted propelling member; a horizontal supporting frame loosely mounted on said member; gears for rotating the latter; a horizontal propelling shaft mounted upon said supporting frame; gears connecting said propelling member and shaft whereby the latter may be rotated; a propelling wheel mounted upon the outer end of said horizontal propelling shaft and having a flattened periphery; a stopping member connected with said bar and adapted to frictionally engage said track, the distance from the axis of said wheel to the flattened portion being such that the latter will be out of engagement with said track when the stopping member is in such engagement, and the distance from said axis to the circular portion of the wheel being such that when such circular portion is in engagement with said track, said stopping member will be out of engagement therewith; a vertical bar fixedly secured to said horizontal bar; a reciprocating member mounted on said vertical bar, and a connecting rod articulating with said wheel and lower end of said reciprocating bar respectively.

12. The combination of a suitable track; a manikin provided with movable leg members and mechanism mounted upon the manikin for actuating same; propelling mechanism including a support for the manikin, a propelling member mounted upon said support and adapted to intermittently engage said track to raise said support and manikin; and means connecting said member with said manikin mechanism, whereby the latter is intermittently propelled.

13. The combination of a manikin including a trunk-member, leg members movably mounted thereon, and mechanism mounted on said trunk member for actuating said leg members, said latter mechanism including two rock-shafts adapted to simultaneously move in opposite directions, and respectively connected with said leg members; a support for said manikin; means for propelling said support; and a vertically reciprocating member mounted upon said support and connected with said shafts.

14. The combination of a manikin including a trunk member, and thigh members mounted upon the latter so as to be oscillatory and at the same time movable in their longitudinal direction; two rock-shafts mounted in said trunk member and having their outer ends articulating with one of said thigh members respectively; and means for oscillating said two shafts in opposite directions simultaneously.

15. In a manikin, the combination of propelling mechanism; a trunk member; movable leg members; mechanism for actuating the leg members; a head and shoulder member oscillatory in a plane transverse with respect to the direction of propulsion of the manikin; and mechanism for effecting such head and shoulder oscillation.

16. In a manikin, the combination of a trunk member; leg members mounted thereon so as to be oscillatory; mechanism for effecting such oscillation; a head and shoulder member carrying the arms of the manikin and pivotally mounted upon said trunk so as to be oscillatory in a plane transverse with respect to the planes of oscillation of the leg members; and means connected with said leg operating mechanism for effecting such oscillation of the head and shoulder member; and propelling mechanism connected with said leg oscillating mechanism.

17. In a manikin, the combination of a trunk-member; thigh members mounted so as to be oscillatory and at the same time movable in their longitudinal direction; mechanism mounted in said trunk member for effecting the oscillation of said leg members in opposite directions simultaneously; a head and shoulder member carrying the arms of the manikin, pivotally mounted upon said trunk member, and adapted to be oscillated in a plane transverse with respect to the planes of oscillation of said leg members; means for effecting such oscillation; propelling mechanism adapted to move the manikin forward, means mounted upon said propelling mechanism for operating said leg actuating mechanism; and means connecting the latter with said head and shoulder member for effecting the movement of the latter upon its axis of oscillation.

18. In a manikin, the combination of a trunk member; a thigh member mounted upon said trunk member so as to be oscillatory and at the same time movable in its longitudinal direction; an oscillatory arm mounted in said trunk member and articulating with said leg member above the axis of oscillation of the latter; means for effecting the oscillation of said arm; a lower leg member mounted on said thigh member, and a foot and ankle member mounted on said lower leg member; said thigh member including a reciprocating member having its lower end articulating with the lower leg member, the latter articulating with the lower end of the main thigh member.

19. In a manikin, the combination of a lower leg member, a foot member, and an ankle member; said lower leg member comprising a main member and a secondary member slidable therein, the said main member being provided with a detent device adapted to engage the secondary member; the latter member movably engaging the ankle member; said foot member articulating with the ankle member and oscillatory thereon; the main lower leg member engaging said foot member so as to limit its oscillation.

20. In a manikin, the combination of a lower leg member, a foot member, and an ankle member; said lower leg member comprising a main member and a secondary member slidable therein, the latter member being provided with a slot, and the main member with a spring adjacent thereto; said ankle member being slidably mounted in the lower part of the main lower leg member and provided with a pin projecting into said slot, said spring adapted to engage said pin when the ankle member is in a raised position; said foot member articulating with the ankle member and oscillatory thereon; said main lower leg member engaging said foot member so as to limit its oscillation in both directions.

21. In a manikin, the combination of a trunk member; an oscillatory arm mounted thereon; a main thigh member mounted upon the trunk member so as to be oscillatory and at the same time movable in the longitudinal direction thereof; said thigh member articulating with said oscillatory arm; a secondary thigh member slidably mounted in said main thigh member; said main and secondary thigh members adapted to engage, so as to prevent such longitudinal movement; means for periodically effecting such engagement and disengagement; a lower leg member having its upper end articulating with the lower end of the main thigh member, and also articulating with the said secondary thigh member; a secondary lower leg member slidably mounted in the main lower leg member, and having its upper end articulating with the main thigh member; an ankle member slidably mounted in the main lower leg member and movably connected with the secondary lower leg member; said ankle member and lower leg member being connected; means for periodically effecting the connection and disconnection of said ankle member with said main lower leg member; and a foot member oscillatorily mounted upon said ankle member.

22. In a manikin, the combination of a trunk member; an oscillatory arm mounted thereon; a main thigh member mounted upon the trunk-member so as to be oscillatory and at the same time movable in the longitudinal direction thereof; said thigh member articulating with said oscillatory arm above its own axis of oscillation; a secondary thigh member slidably mounted in said main thigh member, and formed near its upper end with a slot intersecting its rear edge; a pin fixedly secured to the main thigh member and adapted to engage said slot; a spring fixedly secured to said trunk member, connected with said secondary thigh member, and adapted when said thigh member is in a rearwardly projecting position to disconnect said secondary thigh member from said pin; a lower leg member having its upper end articulating with the lower end of the main thigh member, and at the rear portion thereof, and also articulating at a point in advance of the connection at the rear of said thigh member with the lower end of said secondary thigh member; a secondary lower leg member slidably mounted in the main lower leg member, having its upper end articulating with the lower end of the main thigh member, and having a slot in its lower end; an ankle member slidably mounted in the lower end of the main lower leg member, and provided with a pin projecting through the slot in said secondary lower leg member; a spring mounted upon the main lower leg member and adapted to engage said pin when the ankle member is in a raised position; and a foot member having an axis of oscillation upon the lower and forward part of the ankle member; the lower end of the main lower leg member being provided with a slot, and said foot member provided with a pin projecting through said slot, the latter being located at the rear of said main lower leg member.

Signed by me, this 1st day of July, 1910.
HORACE A. MANN.
Attested by—
JAMES K. LAUHER,
JAMES E. TANNER.